United States Patent
Kokubu et al.

(10) Patent No.: US 11,826,843 B2
(45) Date of Patent: Nov. 28, 2023

(54) METHOD OF PRODUCING A THROTTLE DEVICE

(71) Applicant: AISAN KOGYO KABUSHIKI KAISHA, Obu (JP)

(72) Inventors: Toshihide Kokubu, Bowling Green, KY (US); Mitsushi Taniguchi, Nagoya (JP); Yuichi Kimura, Kariya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 17/703,711

(22) Filed: Mar. 24, 2022

(65) Prior Publication Data
US 2022/0305578 A1    Sep. 29, 2022

(30) Foreign Application Priority Data
Mar. 25, 2021   (JP) ................. 2021-051215

(51) Int. Cl.
*B23F 5/20*      (2006.01)
*F02D 9/10*      (2006.01)
*F02D 11/10*     (2006.01)

(52) U.S. Cl.
CPC ............ *B23F 5/20* (2013.01); *F02D 9/107* (2013.01); *F02D 9/1065* (2013.01); *F02D 11/10* (2013.01); *F02D 2011/102* (2013.01)

(58) Field of Classification Search
CPC .......... B23F 5/20; F02D 9/1065; F02D 9/107; F02D 11/10; F02D 2011/102; F02D 2009/0264; F02D 2009/0269; F02D 2009/0277; F02D 2011/101; F02D 9/10
See application file for complete search history.

(56) References Cited

U.S. PATENT DOCUMENTS

| | | | | |
|---|---|---|---|---|
| 6,543,417 | B2 * | 4/2003 | Tanaka | F02D 11/10 123/399 |
| 10,533,676 | B2 * | 1/2020 | Kokubu | F16K 31/043 |
| 2001/0045202 | A1 * | 11/2001 | Shimura | F02D 11/10 123/399 |
| 2002/0029760 | A1 * | 3/2002 | Saito | F02D 11/10 123/399 |
| 2004/0173184 | A1 | 9/2004 | Tanimura et al. | |
| 2005/0109314 | A1 | 5/2005 | Suzuki et al. | |

(Continued)

FOREIGN PATENT DOCUMENTS

| CN | 1526929 A | 9/2004 |
|---|---|---|
| JP | 2002371866 A | 12/2002 |

(Continued)

OTHER PUBLICATIONS

Chinese Office Action dated Mar. 18, 2023, for Chinese Application No. 202210272071.1 (16 p.).

*Primary Examiner* — Phutthiwat Wongwian
*Assistant Examiner* — Susan E Scharpf
(74) *Attorney, Agent, or Firm* — CONLEY ROSE, P.C.

(57) ABSTRACT

A method of producing a throttle device includes setting an angle between a fully closed position and a default position to a predetermined angle by processing at least one of a gear-side fully closed position stopper on a throttle gear, a body-side fully closed position stopper on a throttle body, a default position defining member, a body-side engaging portion of the throttle body, or a gear-side engaging portion of the throttle gear.

10 Claims, 13 Drawing Sheets

(56) References Cited

U.S. PATENT DOCUMENTS

2007/0068581 A1* 3/2007 Kondo .................... F02D 11/10
                                                                      137/554
2018/0066763 A1* 3/2018 Kokubu ................. F02D 11/10

FOREIGN PATENT DOCUMENTS

| JP | 2005163546 A | 6/2005 |
| JP | 2018040288 A | 3/2018 |

* cited by examiner US 11,826,843 B2

METHOD OF PRODUCING A THROTTLE DEVICE

CROSS REFERENCE TO RELATED APPLICATIONS

This application claims priority to Japanese patent application serial number 2021-051215, filed Mar. 25, 2021, which is hereby incorporated herein by reference in its entirety for all purposes.

BACKGROUND

The present disclosure relates to a method of producing a throttle device that adjusts the flow rate of combustion air supplied to an engine.

FIG. 14 depicts a throttle device 100 related to the throttle device mentioned above. As shown in FIG. 14, the throttle device 100 includes a throttle body 103 having an intake passage 103h for leading combustion air to the engine. The throttle device 100 also includes a throttle valve (not shown) within the intake passage 103h, the throttle valve being rotatable about a throttle shaft 105 between a fully closed position and a fully open position. The throttle device 100 further includes a gear mechanism including a throttle gear 107 and transmission gears 106w, 106x. The transmission gears 106w, 106x transmit the rotational force of the motor 106 to the throttle shaft 105 attached to the throttle gear 107. The throttle device 100 further includes a torsion spring 108 that exerts a biasing force to the throttle gear 107, so that the throttle valve rotates toward a default position (which is a position slightly opened from the fully closed position).

The throttle body 103 is provided with a fully closed position defining screw 110. The fully closed position defining screw 110 is configured to adjustably define the fully closed position of the throttle valve (or the throttle gear 107). The throttle body 103 is also provided with a default position defining screw 112 that defines the default position of the throttle valve. The fully closed position of the throttle valve and the default position may be adjusted by the fully closed position defining screw 110 and the default position defining screw 112. However, it is difficult to reduce the size of the throttle body 103 when forming a throttle body that includes the fully closed position defining screw 110 and the default position defining screw 112. Such a throttle body 103 also increases the production cost. Furthermore, a design that allows everyone to adjust the fully closed position defining screw 110 and the default position defining screw 112 is not desirable. Such a device would also require features to prevent the screws 110, 112 from falling out and to ensure airtightness of any gap between the screw holes and the screws 110, 112.

FIG. 15 depicts another throttle device 120. As shown in FIG. 15, the throttle device 120 includes a fully closed position defining mechanism 125. The fully closed position defining mechanism 125 comprises an arm 125r attached to the throttle shaft 123 and a stopper 125s provided on the throttle body 121. To adjust the fully closed position defining mechanism 125, the throttle valve 122 is set in the fully closed position (the position shown in FIG. 15), with the separately prepared arm 125r held in contact with the stopper 125s provided on the throttle body 121. The arm 125r is then welded in that relative position to the throttle shaft 123 so that they are no longer relatively rotatable. This method eliminates the above-mentioned for a fully closed position defining screw 110. The default position of the throttle valve can be adjusted in a similar method, which eliminates the above-mentioned default position defining screw 112.

SUMMARY

The fully closed position stopper mechanism 125 shown in FIG. 15 includes the fully closed position defining arm 125r. The fully closed position defining arm 125r requires a relatively wide space for the rotation of the fully closed position defining arm 125r. Furthermore, the fully closed position defining arm 125r and the throttle gear (shown by the two-dot chain line) are required to be welded to the throttle shaft 123 in separate steps, rendering the work troublesome.

It is thus desirable to avoid using a screw-adjustable fully closed position stopper, thereby eliminating the need for taking measures to prevent the screws from falling out and to ensure airtightness of the gaps between the screw holes and the screws. It is also desired to avoid using a fully closed position defining arm, thereby resulting in device with a reduced size and in simplifying the work needed for adjusting the fully closed and default positions.

One aspect of the present disclosure is a method of producing a throttle device. The throttle device includes a throttle body with an intake passage configured to lead combustion air to an engine; a throttle valve equipped with a throttle shaft, the throttle valve being rotatable between a fully closed position and a fully open position within the intake passage; a throttle gear configured to transmit a rotational force from an electric actuator to the throttle shaft. The throttle device further includes a body-side fully closed position stopper on the throttle body and a gear-side fully closed position stopper on the throttle gear, wherein the body-side fully closed position stopper blocks the gear-side fully closed position stopper to prevent the throttle valve from rotating in a closing direction beyond the fully closed position.

The throttle device further includes a biasing member urging the throttle gear to rotate the throttle valve from the fully closed position and from the fully open position toward an intermediate default position, the default position being a predetermined angle from the fully closed position. The biasing member includes a default position defining member configured to engage a gear-side engaging portion of the throttle gear when the throttle valve is opened more than the default position, and engage a body-side engaging portion of the throttle body when the throttle valve is closed more than the default position.

The method includes processing at least one of the gear-side fully closed position stopper on the throttle gear, the body-side fully closed position stopper on the throttle body, the default position defining member, the body-side engaging portion of the throttle body, or the gear-side engaging portion of the throttle gear, so that an angle between the fully closed position and the default position forms the predetermined angle.

DETAILED DESCRIPTION

Figure 1:
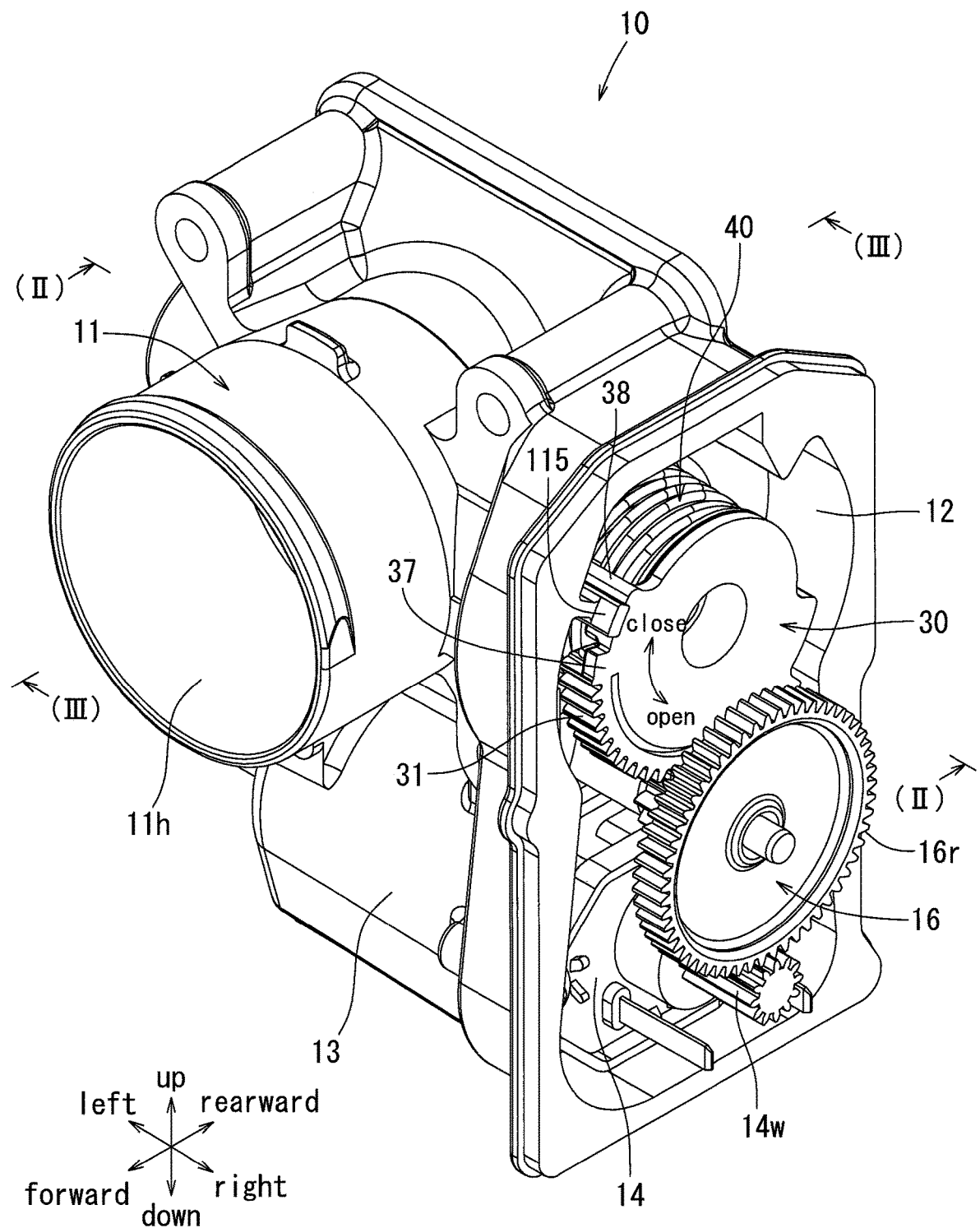
FIG. 1 is a perspective view of a throttle device according to an embodiment as seen from the upper right.

Embodiments will now be described with reference to the drawings. A throttle device adjusts the flow rate of combustion air supplied to a vehicle engine (not shown). The throttle device includes an intake passage connected to an intake passage of the engine. For convenience, the front-rear, left-right, and up-down directions are defined as indicated in the drawings. In particular, the central axis (axial direction) of the intake passage is taken as the rearward-forward direction.

Figure 2:
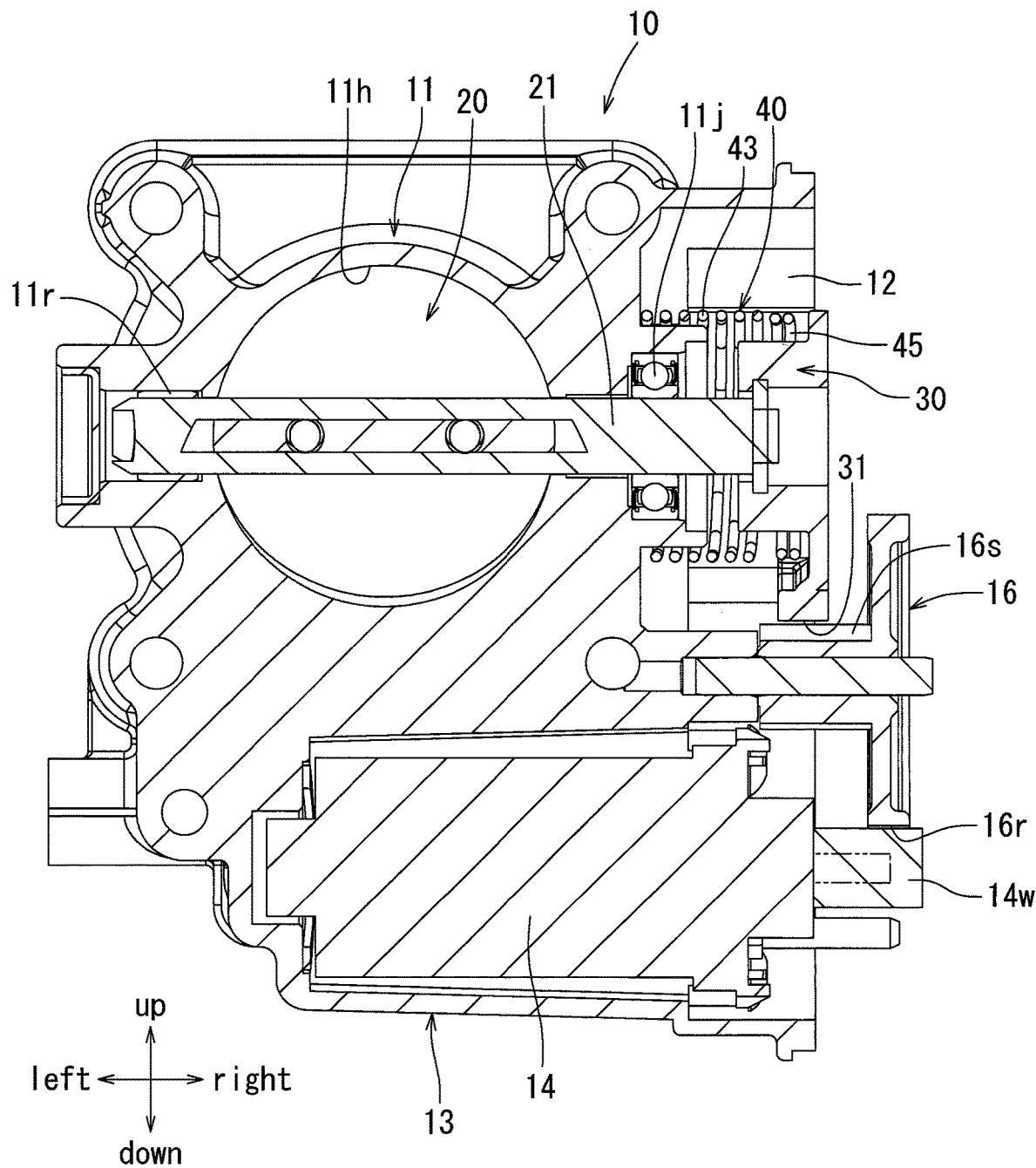
FIG. 2 is a vertical cross-sectional view of the throttle device of FIG. 1 taken along line II-II in FIG. 1, as seen in the direction of the axis of the intake passage.
Figure 3:
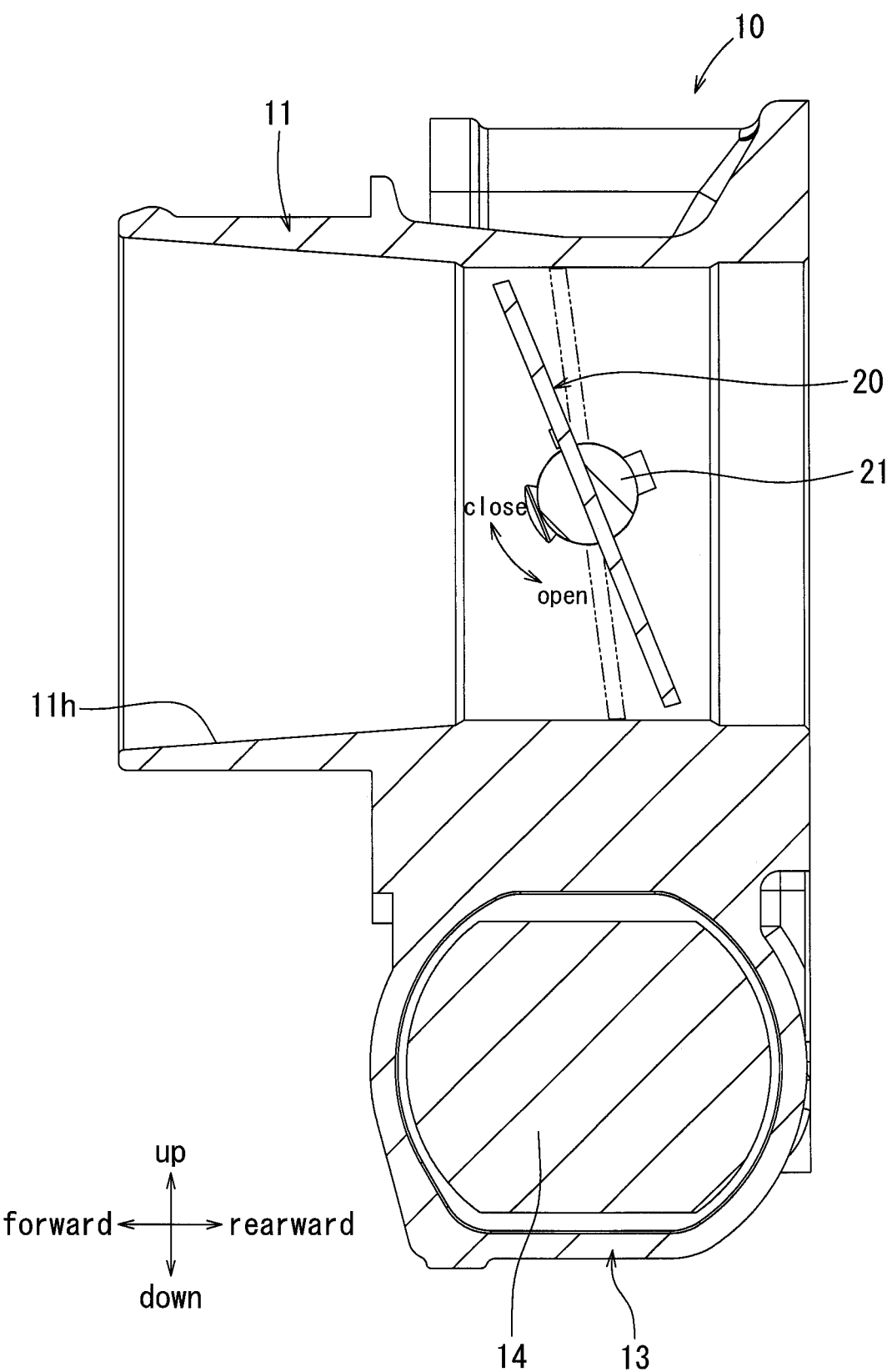
FIG. 3 is a vertical cross-sectional view of the throttle device of FIG. 1 taken along line II-II FIG. 1, as seen in the direction perpendicular to the axis of the intake passage.

As shown in FIG. 1, the throttle device includes a throttle body 10. The throttle body 10 includes a substantially cylindrical throttle pipe or bore portion 11 having an intake passage 11h, a gear housing portion 12 formed on the right side of the throttle pipe portion 11, and a motor housing portion 13 provided under the throttle pipe portion 11. In FIG. 1, the cover for the gear housing portion 12 has been removed. As shown in FIGS. 2 and 3, the throttle pipe portion 11 of the throttle body 10 includes a throttle valve 20 positioned so as to cross the intake passage 11h.

As shown in FIG. 2, the throttle valve 20 is a disk-shaped butterfly valve. The throttle valve 20 is configured to be rotatable within the intake passage 11h between a fully closed position and a fully open position. For this purpose, a throttle shaft 21 extends in the left-right direction. The throttle shaft 21 is non-rotatably fixed to the center of rotation of the throttle valve 20. The left end of the throttle shaft 21 is rotatably supported by the left bearing portion 11r of the throttle pipe portion 11. On the right, the throttle shaft 21 is rotatably supported by the right bearing portion 11j of the throttle pipe portion 11. The right end of the throttle shaft 21 extends into the gear housing portion 12 of the throttle body 10. A throttle gear 30 is secured to the right end of the throttle shaft 21 in a relatively non-rotatable manner.

Figure 4:
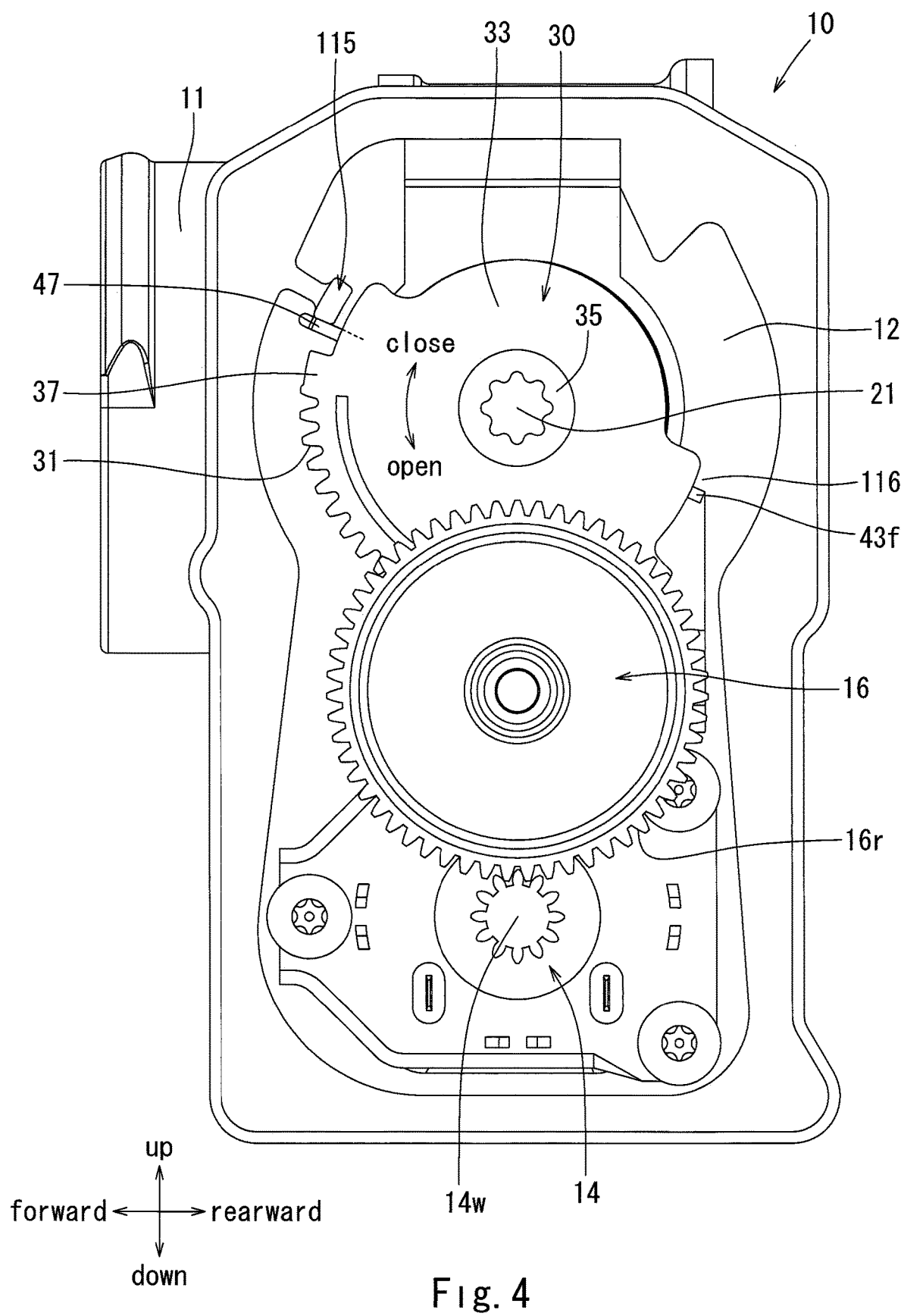
FIG. 4 is a side view of the throttle device of FIG. 1 as viewed from the right side.

As shown in FIGS. 1 and 2, the motor 14 is housed in the rightward position in the motor housing portion 13 of the throttle body 10, and the output shaft (not shown) of the motor 14 extends into the gear housing portion 12. As shown in FIGS. 2 and 4, a drive gear 14w is secured to the output shaft of the motor 14, and the drive gear 14w meshes with large-diameter gear teeth 16r of an intermediate counter gear 16 arranged in the gear housing portion 12. Then, as shown in FIG. 2, small-diameter gear teeth 16s of the counter gear 16 mesh with the gear teeth 31 formed on the peripheral surface of the throttle gear 30. When the motor 14 is driven, the rotational force from the motor 14 is transmitted through the drive gear 14w, counter gear 16, and throttle gear 30 to the throttle shaft 21, and thereby the throttle valve 20 rotates within the intake passage 11h.

A helical torsion spring 40 is mounted around the cylindrical wall 32 (see FIGS. 2 and 5) of the throttle gear 30. The spring 40 is urged so that the throttle valve 20 can be held at the default position (shown in FIG. 3 in solid lines) via the throttle gear 30 when the motor 14 is stopped (or when the motor 14 fails). The default position is a position of the throttle valve 20 where it is rotated from the fully closed position (see the two-dot chain line in FIG. 3) in the opening direction by a predetermined angle (for example, 8°).

Figure 5:
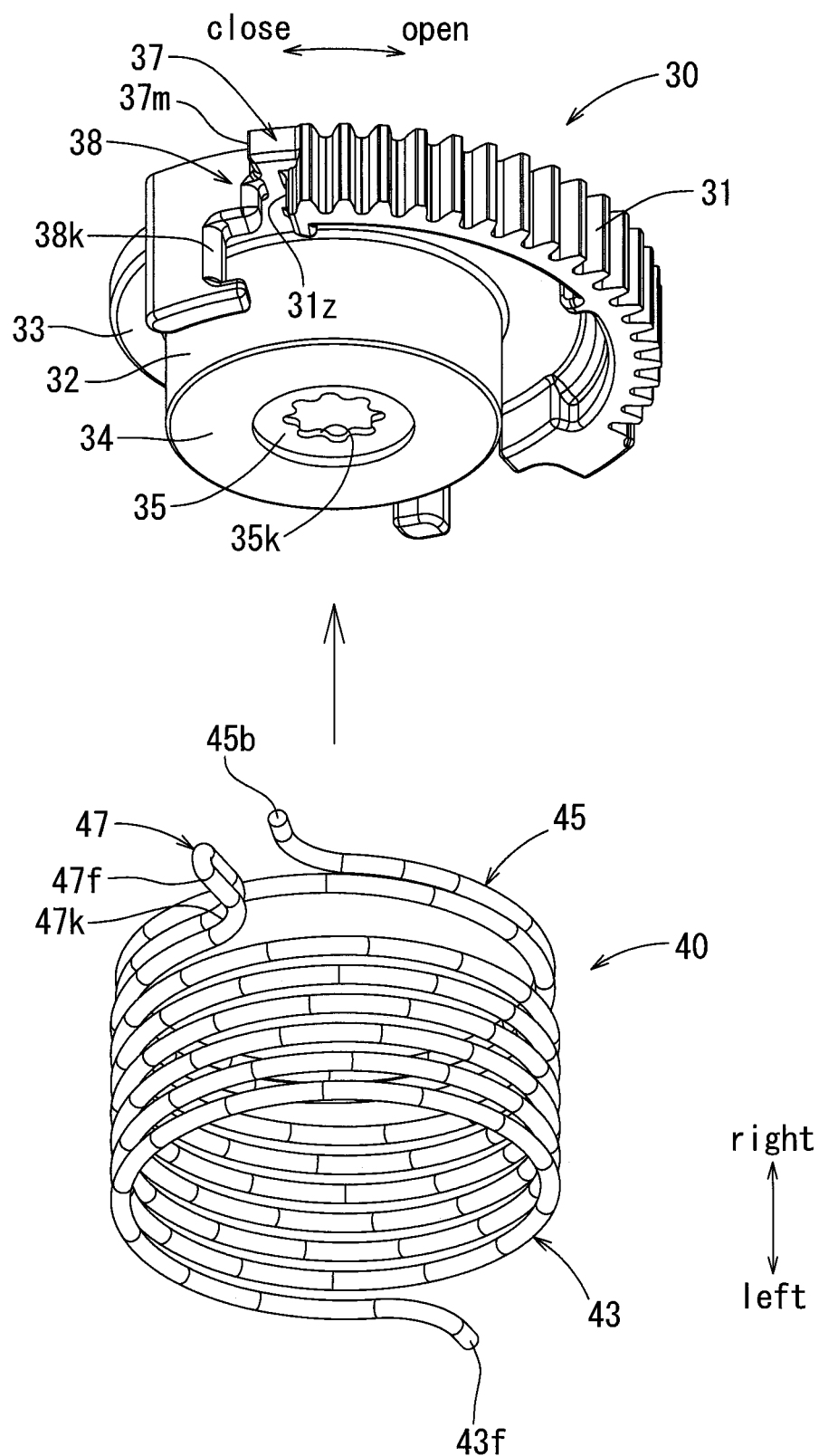
FIG. 5 is a perspective exploded view of the throttle gear and the spring of the throttle device of FIG. 1.

As shown in FIG. 5, the spring 40 includes a return spring portion 43 and an opener spring portion 45, these portions connected in series. The return spring portion 43 is wound clockwise and exerts a closing force on the throttle gear 30 when the throttle valve 20 (throttle gear 30) rotates in the opening direction from the default position. The opener spring portion 45 is wound counterclockwise and exerts an opening force on the throttle gear 30 when the throttle valve 20 (throttle gear 30) rotates in the closing direction from the default position.

As shown in FIG. 5, the spring 40 is bent to form a U-shaped connecting portion between the return spring portion 43 and the opener spring portion 45. The U-shaped connecting portion is bent to form a generally L-shaped hook projecting radially outward from the spring 40. This bent U-shaped connecting portion of the spring 40 serves as a default position defining portion 47. The terminal end 43f of the return spring portion 43 (the end opposite the connected end) is hooked on the spring hooking portion 11b (see FIG. 4) of the throttle body 10. The terminal end 45b of the opener spring portion 45 (the end opposite the connected end) is hooked on the spring hooking portion 31z (see FIG. 5) of the throttle gear 30.

The throttle gear 30 may be made of a plastic. The throttle gear 30 is configured to transmit the rotational force from the motor 14 to the throttle shaft 21, as described above. As shown in FIG. 5, the throttle gear 30 has a cylindrical wall 32 with a diameter sized such that the cylindrical wall 32 can be inserted in the spring 40. The throttle gear 30 also has an outward flange 33 at the right (top) end of the cylindrical wall 32 and an inward flange 34 at the left (bottom) end of the cylindrical wall 32. The throttle gear 30 has an arc-shaped series of gear teeth 31 on the peripheral surface of the flange 33. The throttle gear 30 includes a connecting plate 35 fixed to the inward flange 34 of the throttle gear 30. The connecting plate may be fixed by insert molding, such that the through hole 35k is positioned coaxially with the cylindrical wall 32.

The connecting plate 31 has a through hole 35k. A portion at the right end of the throttle shaft 21, which has a smaller diameter than the through hole 35k, is inserted into the through hole 35k of the connecting plate 35 of the throttle gear 30 and clinched. The throttle shaft 21 and the throttle gear 30 are held so as not to rotate relative to each other. The center of the arc of the gear teeth 31 of the throttle gear 30 is aligned with the axis of the throttle shaft 21.

As shown in FIG. 5, at the end of the series of the gear teeth 31 in the closing direction, the throttle gear 30 includes a fully closed position stopper 37 and a spring hooking portion 31z. The spring hooking portion 31z is provided on the left (or lower) side of the fully closed position stopper 37. The throttle gear 30 includes a flat plate-shaped spring receiving block 38 projecting leftward (or downward as shown) and positioned at a location which is further in the closing direction than the fully closed position stopper 37 of the throttle gear 30 and corresponds to the spring hooking portion 31z. The spring receiving block 38 has a recessed contact surface 38k at a location diagonally to the left (downward) of the spring hooking portion 31z. The recessed contact surface 38k is engaged by the default position defining portion 47.

Figure 6:
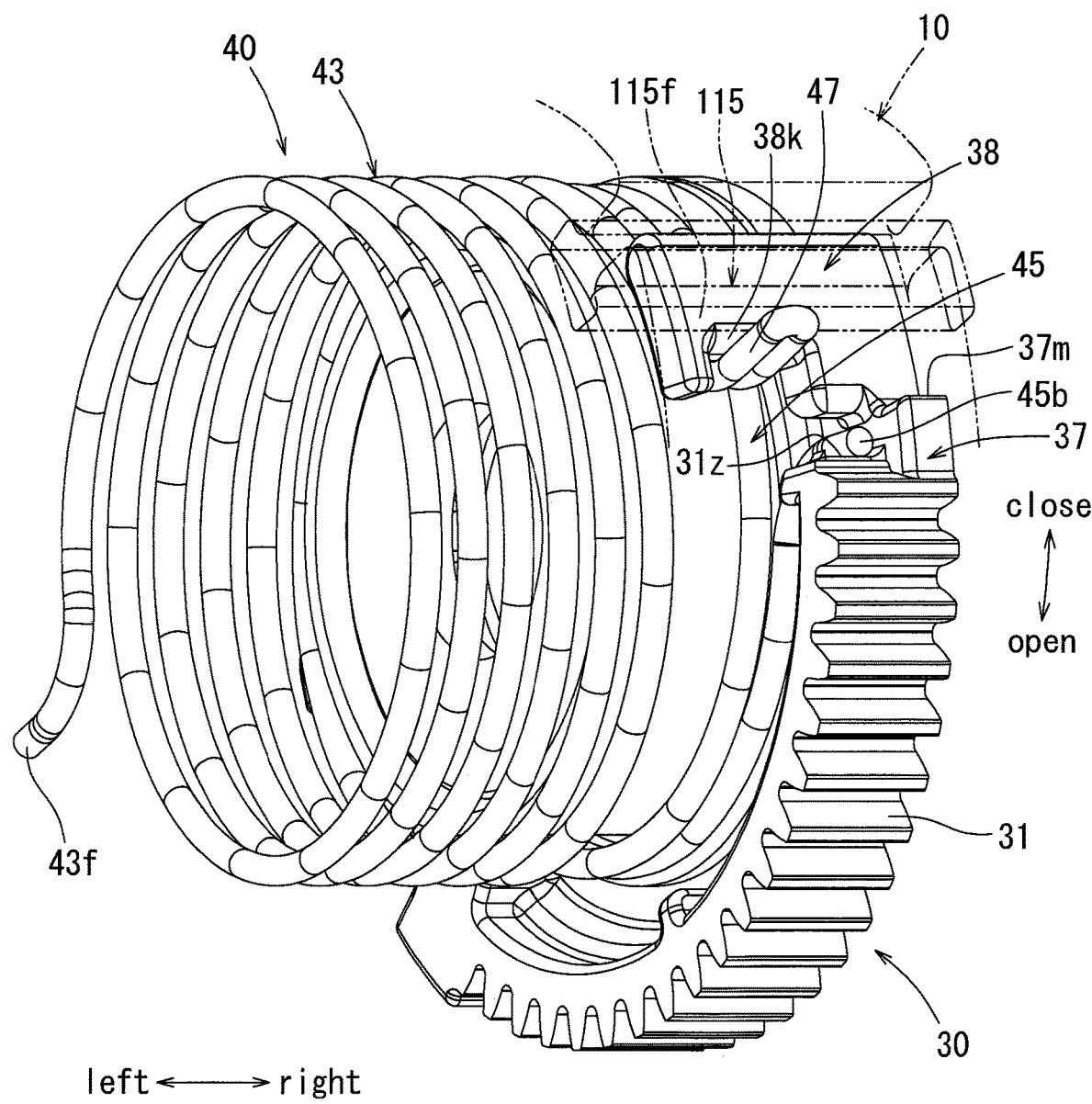
FIG. 6 is a perspective view of the throttle gear, the spring, and the body-side stopper of the throttle body when the throttle valve is in the default position.
Figure 7:
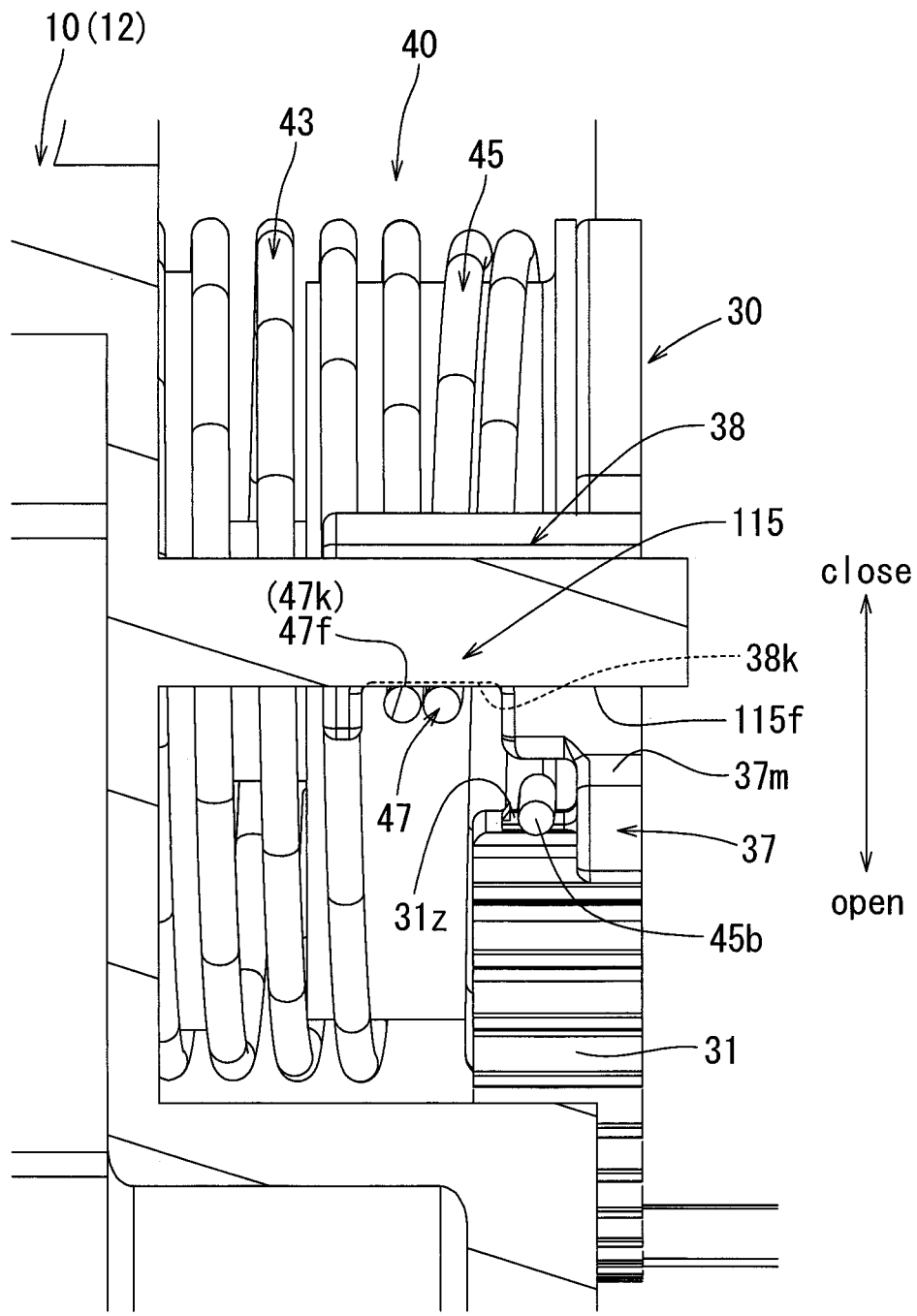
FIG. 7 is a plan view of the throttle gear, the spring, and the body-side stopper of the throttle body when the throttle valve is in the default position.

To attach the spring 40 to the throttle gear 30, an embodiment of the resulting attachment of which is shown in FIGS. 6 and 7, firstly, the opener spring portion 45 of the spring 40 is inserted over the cylindrical wall 32 of the throttle gear 30. The gear-side end 45b of the opener spring portion 45 is then hooked on the spring hooking portion 31z of the throttle gear 30. The default position defining portion 47 of the spring 40 is hooked on the spring receiving block 38 of the throttle gear 30. Through these steps, the spring 40 is attached to the throttle gear 30, with the default position defining portion 47 and the gear-side end 45b of the spring 40 pinched between the spring receiving block 38 and the spring hooking portion 31z of the throttle gear 30. The opener spring portion 45 of the spring 40 is thus provided with a preloaded torsion for ensuring that the throttle valve 20 returns to the default position.

Next, the throttle gear 30, with the spring 40 attached, is installed in the gear housing portion 12 of the throttle body 10. As shown in FIG. 4, the side wall of the gear housing portion 12 of the throttle body 10 includes a combined body-side stopper 115. The combined body-side stopper 115 is positioned radially outward of the throttle gear 30 and diagonally forward and upward with respect to the axis of the throttle shaft 21. As shown in FIG. 7, the combined body-side stopper 115 extends in the left-right direction and in parallel to the throttle shaft 21. The combined body-side stopper 115 may be formed in the shape of a rectangular bar.

Figure 9:
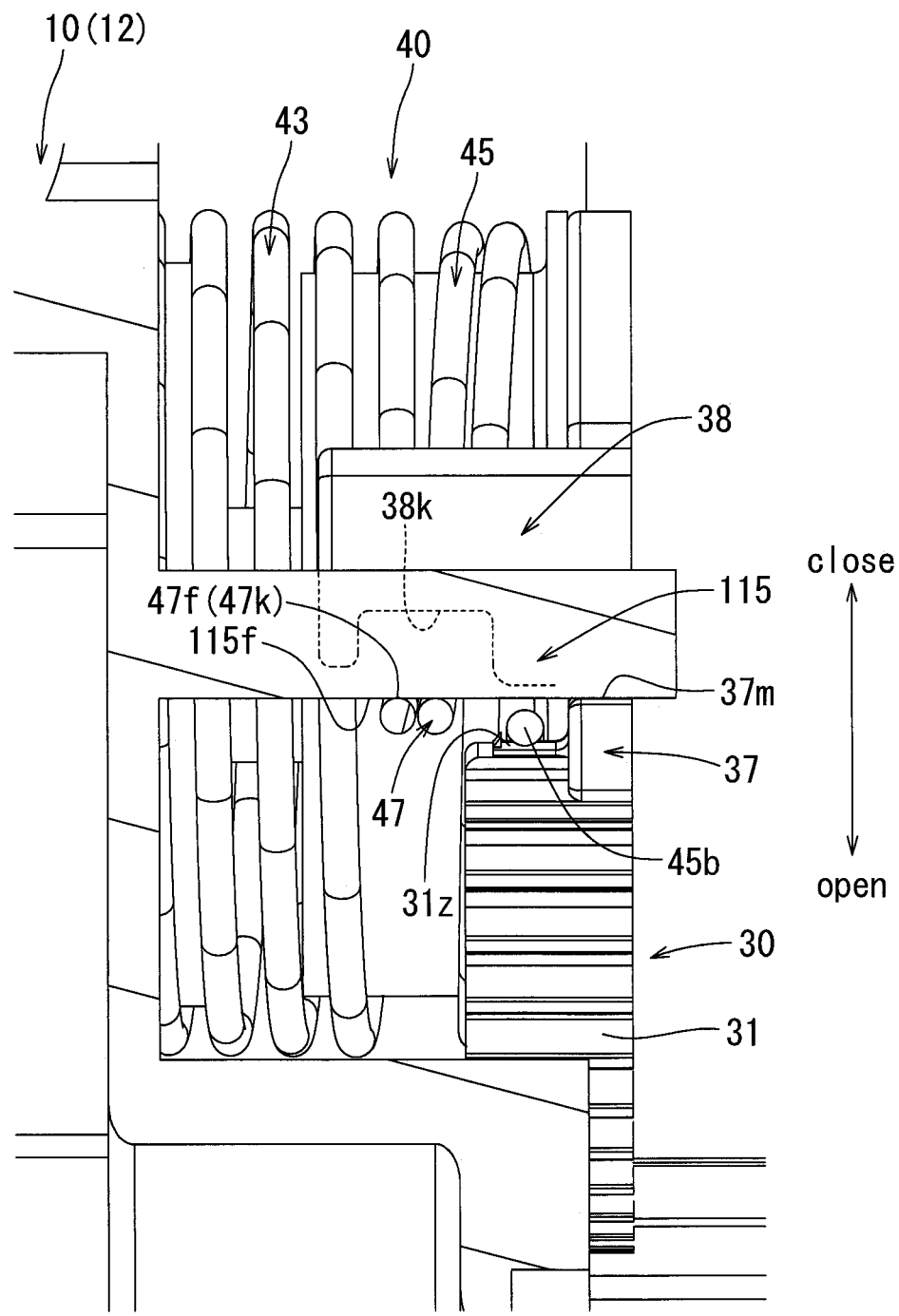
FIG. 9 is a plan view of the throttle gear, the spring, and the body-side stopper on the throttle body when the throttle valve is in the fully closed position.

As shown in FIGS. 7 and 9, the combined body-side stopper 115 has a single contact surface 115f that is configured to contact both the contact surface 47f of the default position defining portion 47 of the spring 40 and the contact surface 37m of the gear-side fully closed position stopper 37 on the throttle gear 30. Therefore, the combined body-side stopper 115 of the throttle body 10 serves both as the body-side engaging portion where the default position defining portion 47 of the spring 40 engages, and as the body-side fully closed position stopper where the gear-side fully closed position stopper 37 contacts. As shown in FIG. 4, the side wall of the gear housing portion 12 of the throttle body 10 includes a spring hooking portion 116 located opposite to the combined body-side stopper 115 with respect to the throttle shaft 21. The body-side end 43f of the return spring portion 43 of the spring 40 is hooked on the spring hooking portion 116 of the throttle body 10.

As shown in FIG. 4, the spring 40 and the throttle gear 30 are installed in the throttle body 10, with the body-side end 43f of the spring 40 hooked on the spring hooking portion 116 of the throttle body 10, and with the default position defining portion 47 in contact with the combined body-side stopper 115.

As shown in FIGS. 6 and 7, when the throttle valve 20 is in the default position (an embodiment of which is shown in FIG. 3 by solid lines), the outer contact surface 47f of the default position defining portion 47 of the spring 40 is in contact with the combined body-side stopper 115 of the throttle body 10. At the same time, the inner contact surface 47k of the default position defining portion 47 is in contact with the spring receiving block 38 of the throttle gear 30. The return spring portion 43 and the opener spring portion 45 of the spring 40 are provided with preloaded torsions for ensuring that the throttle valve 20 returns to the default position. Thus, the contact surfaces 47f, 47k of the default position defining portion 47 and the contact surface 115f of the combined body-side stopper 115 together define the default position of the throttle valve 20.

Figure 8:
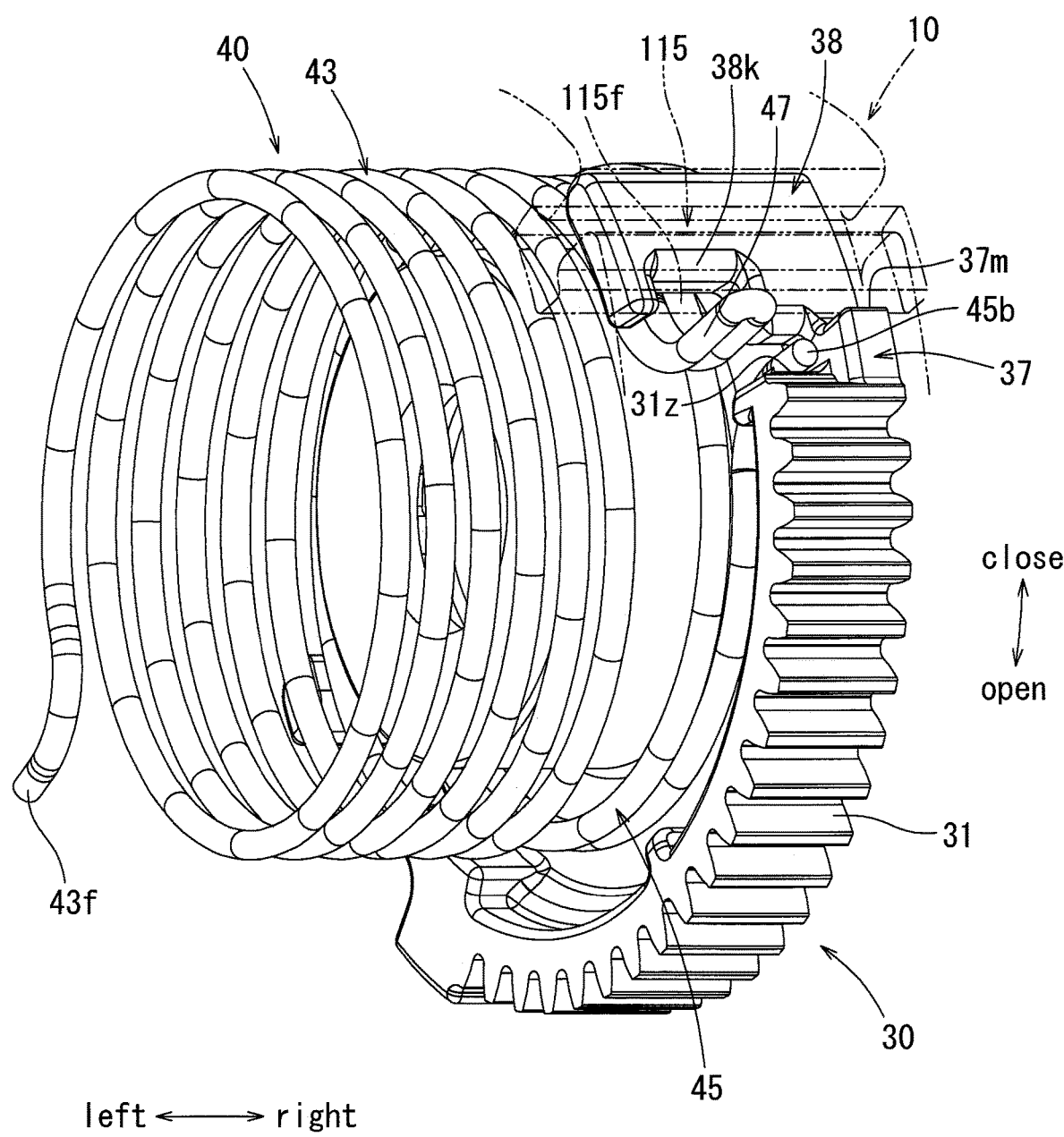
FIG. 8 is a perspective view of the throttle gear, the spring, and the body-side stopper on the throttle body when the throttle valve is in the fully closed position.

As shown in FIGS. 8 and 9, when the throttle valve 20 is rotated by the motor 14 in the closing direction from the default position, the gear-side end 45b of the spring 40 (opener spring portion 45) is pulled in the closing direction as the throttle gear 30 rotates. During this, the default position defining portion 47 of the spring 40 remains hooked on the combined body-side stopper 115 of the throttle body 10. Therefore, the gear-side end 45b of the opener spring portion 45 approaches the default position defining portion 47, thereby causing the opener spring portion 45 to shrink radially. As a result, the opener spring portion 45 of the spring 40 exerts an increased urging force on the throttle gear 30 in the opening direction. As shown in FIG. 9, when the throttle valve 20 reaches the fully closed position (an embodiment of which is shown in FIG. 3 by the dot-chain lines), the gear-side fully closed position stopper 37 of the throttle gear 30 contacts the combined body-side stopper 115 of the throttle body 10. Thus, contact between the contact surface 37m of the gear-side fully closed position stopper 37 of the throttle gear 30 and the contact surface 115f of the combined body-side stopper 115 together generally correspond to the fully closed position of the throttle valve 20.

When the throttle valve 20 is rotated by the motor 14 in the opening direction from the default position, the contact surface 47k of the default position defining portion 47 of the spring 40 is pulled by the spring receiving block 38 of the throttle gear 30. This results in the contact surface 47k of the default position defining portion 47 separating from the combined body-side stopper 115. Since the body-side end 43f of the spring 40 is hooked on the spring hooking portion 116 of the throttle body 10, the pulling of the default position defining portion 47 by the spring receiving block 38 causes the return spring portion 43 to shrink radially. As a result, the return spring portion 43 of the spring 40 exerts an increased returning force to the throttle gear 30 in the closing direction.

Referring to FIGS. 10-13, the mechanism defining the default and fully closed positions can be adjusted before installation of the throttle body 10. This may be done using a support fixture 50 configured to support the throttle gear 30 and the spring 40 in the same manner as the throttle body 10. The support fixture 50 may include a shaft member D configured to support the throttle gear 30 in the same manner as the throttle shaft 21. The support fixture 50 also includes a positioning member 52 located at a position corresponding to the combined body-side stopper 115 of the throttle body 10. The support fixture 50 is associated with a cutting tool 54, such as an end mill, capable of cutting the contact surface 37m of the gear-side fully closed position stopper 37 of the throttle gear 30 set on the support fixture 50.

Figure 10:
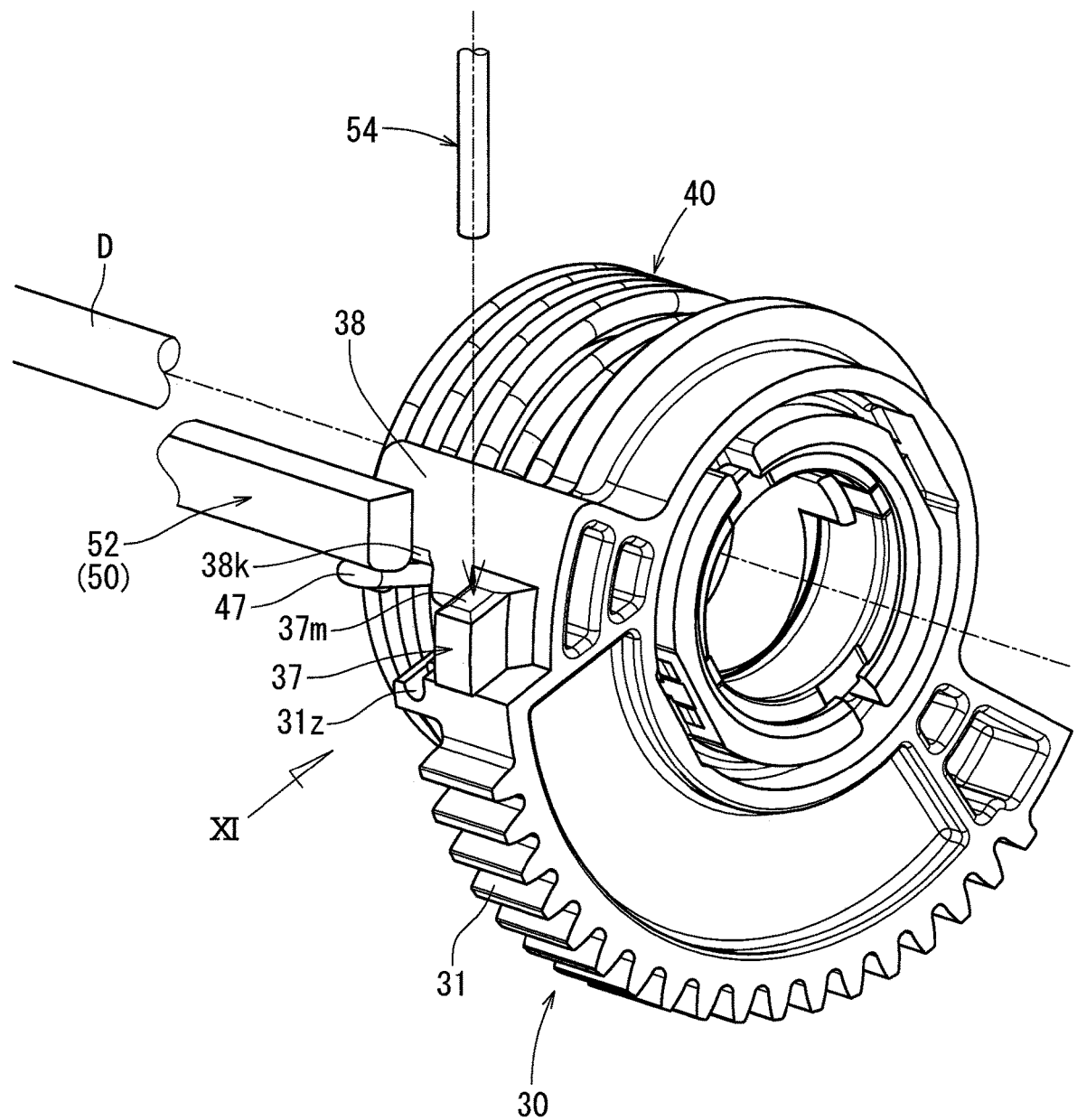
FIG. 10 is a perspective view showing how the contact surface of the gear-side fully closed position stopper on the throttle gear is cut with a cutting tool while the throttle gear with the spring attached thereto is set on a support fixture.
Figure 11:
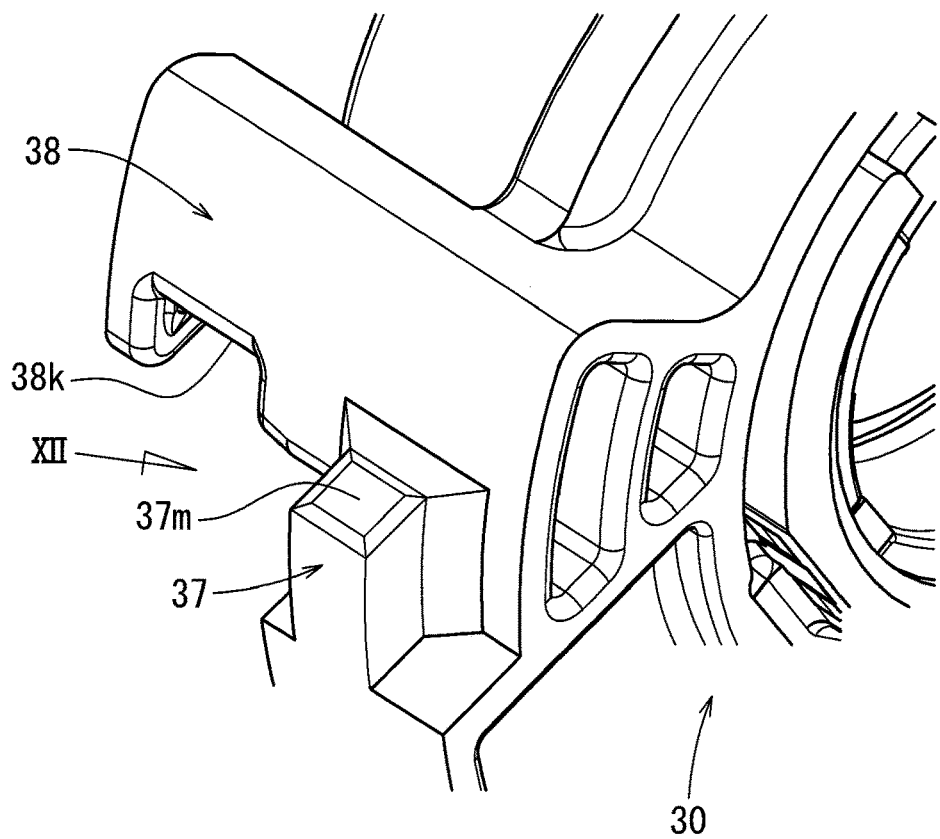
FIG. 11 is a partial enlarged view of the throttle gear of FIG. 10 as seen from the direction indicated by the arrow XI in FIG. 10.
Figure 12:
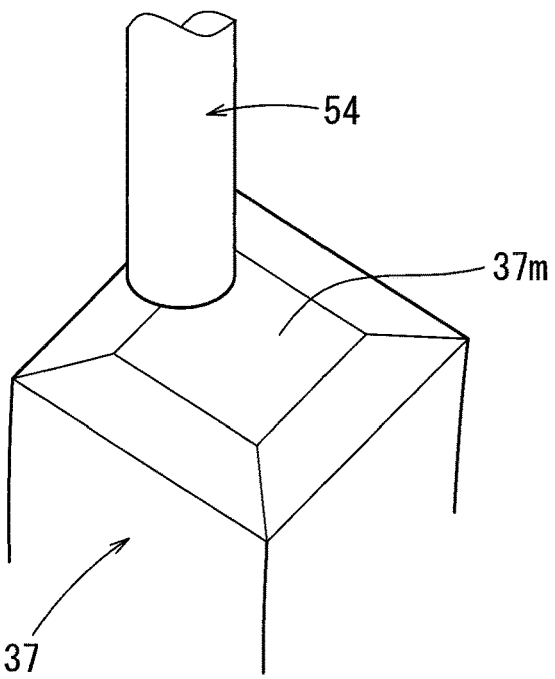
FIG. 12 is a partial enlarged view of the contact surface of the gear-side fully closed position stopper of FIG. 11 being cut with a cutting tool, as seen from the direction indicated by the arrow XII in FIG. 11.
Figure 13:
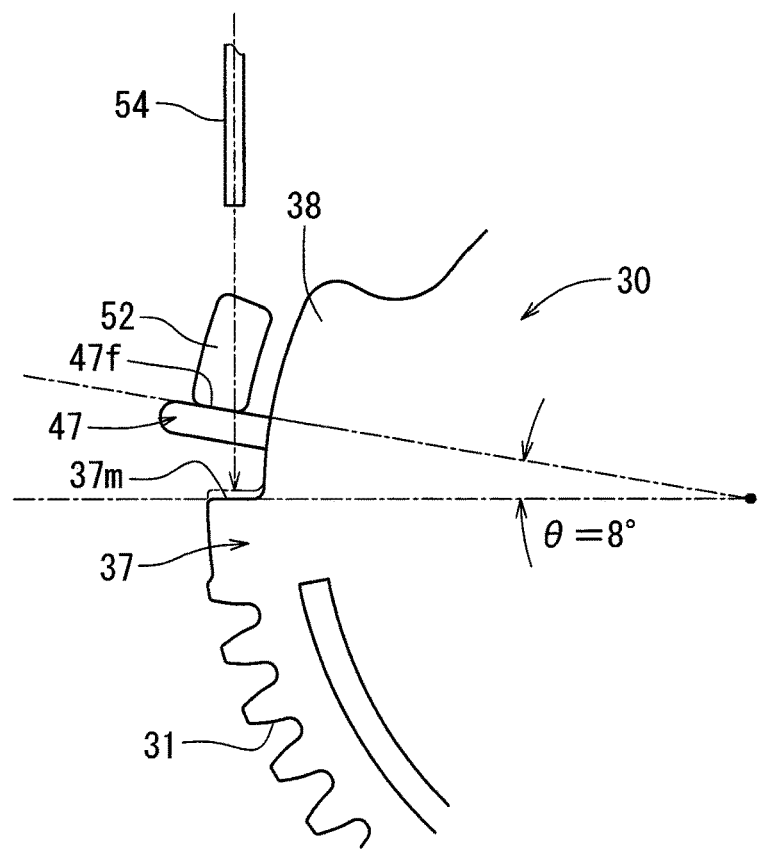
FIG. 13 is an enlarged side view of the default position defining portion of the spring and the contact surface of the gear-side fully closed position stopper on the throttle gear being cut by the cutting tool.
Figure 14:
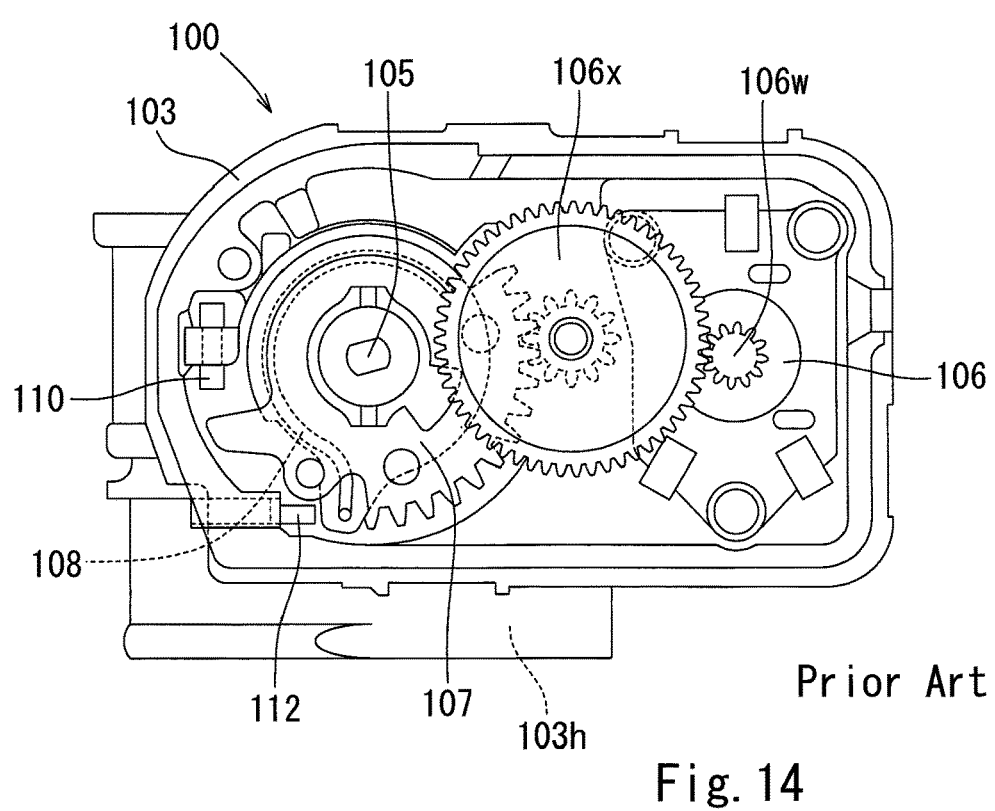
FIG. 14 is an overall side view of a conventional throttle device.
Figure 15:
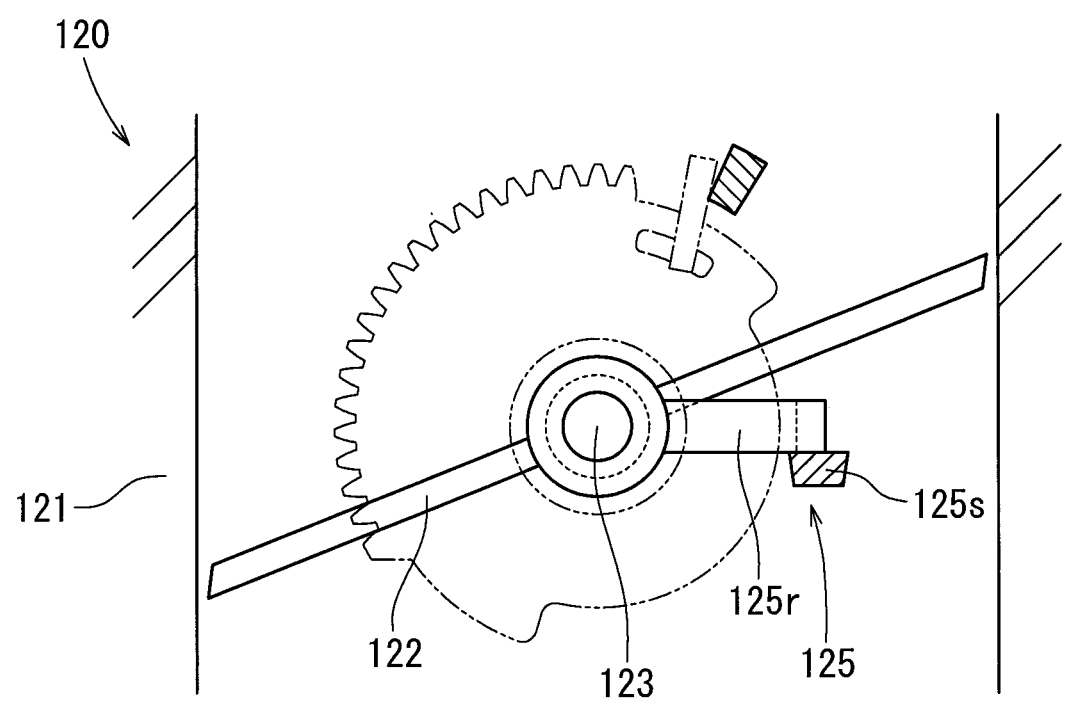
FIG. 15 is a side view of a throttle valve with a fully closed position defining mechanism of another conventional throttle device as seen from the direction perpendicular to the axis of the intake passage.

To adjust the default and fully closed position defining mechanism, the shaft member D is inserted through the through hole 35k of the throttle gear 30 with the spring 40 attached thereto. Also, as shown in FIGS. 10 and 13, the contact surface 47f of the default position defining portion 47 of the spring 40 is held in contact with the lower contact surface of the positioning member 52. As shown in FIG. 13, the contact surface 37m of the gear-side fully closed position stopper 37 of the throttle gear 30 is then cut with the cutting tool 54, which may be an end mill, to the desired default angular position corresponding to the default angle of opening θ (for example, 8°). The default angle of opening θ may be measured from the contact surface 47f of the default position defining portion 47 of the spring 40. As shown in FIGS. 11 and 12, the contact surface 37m of the fully closed stopper 37 may be formed in the shape of the top face of a pyramidal frustum or truncated pyramid, which may reduce burrs from being formed on the contact surface 37m.

When the cutting process is completed, the throttle gear 30 and the spring 40 are set in position in the throttle body 10, for example utilizing the steps described above. At this stage of assembly, the throttle gear 30 and the throttle shaft 21 are still relatively rotatable. The contact surface 37m of the gear-side fully closed position stopper 37 of the throttle gear 30 is then held in contact with the contact surface 115f of the combined body-side stopper 115 of the throttle body 10 (see FIGS. 8 and 9). While these surfaces are held in contact, the throttle valve 20, which is fixed to the throttle shaft 21, is also held in the fully closed position. These steps establish the relative position of the throttle gear 30 and the throttle valve 20 (or the throttle shaft 21). The throttle shaft 21 and the throttle gear 30 are then fixed so as not to be able to rotate relative to each other, for instance by the clinching process mentioned above. This completes the adjustment of the fully closed and default position defining mechanism.

In the embodiments described above, the default position defining portion 47 of the spring 40 is held in a relative position corresponding to where it would contact with the combined body-side stopper 115 of the throttle body 10 once assembled. The contact surface 37m of the gear-side fully closed position stopper 37 of the throttle gear 30 is then cut so that an angle between the contact surface 37m and the default position defining portion 47 forms a predetermined angle. The default angle of the opening may be measured between the contact surface 37m of the gear-side fully closed position stopper 37 and the contact surface 47f of the default position defining portion 47 of the spring 40. Thus, the default position of the throttle valve 20 can be adjusted by cutting the contact surface 37m of the gear-side fully closed position stopper 37 on the throttle gear 30. This method eliminates the need for a screw-adjustable fully closed position stopper or a conventional fully closed position defining arm, mentioned above. This method also simplifies the process of adjustment of the stoppers.

Furthermore, the adjustment of the default position uses the simple method of cutting the contact surface 37m of the gear-side fully closed position stopper 37.

The contact surface 37m of the fully closed stopper 37 is formed in the shape of the top face of a truncated pyramid. This shape reduces generation of burrs when cutting the contact surface 37m.

The contact surface 37m of the gear-side fully closed position stopper 37 is cut while the throttle gear 30 and the spring 40 are set on a support fixture 50 separate from the throttle body 10. This method prevents swarf or dust from entering the throttle body 10 during the cutting process.

The contact surface 37m of the gear-side fully closed position stopper 37 of the throttle gear 30 in the above embodiments has been described as a machined product formed by a cutting tool 54, such as an end mill. However, in another embodiment, the contact surface 37m may be formed by being ground or otherwise machined, thermally deformed, or processed in any other suitable method.

In the above embodiment, the contact surface 37m of the gear-side fully closed position stopper 37 on the throttle gear 30 has been processed while the contact surface 47f of the default position defining portion 47 of the spring 40 is held in a relative position where it will be in contact with the combined body-side stopper 115 of the throttle body 10. However, in another embodiment, the contact surface 115f of the combined body-side stopper 115 on the throttle body 10 (in a portion thereof where the gear-side fully closed position stopper 37 on the throttle gear 30 is configured to contact) may be processed while the default position defining portion 47 of the spring 40 is held in contact with the combined body-side stopper 115 of the throttle body 10.

In the above embodiment, the throttle gear 30 and the throttle shaft 21 have been described as fixed in a relatively non-rotatable manner by clinching. However, in another embodiment, the throttle gear 30 and the throttle shaft 21 may be fixed in a relatively non-rotatable manner by welding or any other suitable connection or joining method.

In the above embodiment, the contact surface 37m of the gear-side fully closed position stopper 37 of the throttle gear 30 has been processed while the default position defining portion 47 of the spring 40 is held in a relative position where it will be in contact with the combined body-side stopper 115 (for instance by the positioning member 52 of the support fixture 50). However, in another embodiment, the contact surface 47f of the default position defining portion 47 of the spring 40 or the contact surface 115f of the combined body-side stopper 115 may be processed while the gear-side fully closed position stopper 37 of the throttle gear 30 is held in contact with of the combined body-side stopper 115.

In another embodiment, the contact surface 38k of the spring receiving block 38 on the throttle gear 30 or the inner contact surface 47k of the default position defining portion 47 of the spring 40 may be processed instead of or in addition to the outer contact surface 47f.

In the above embodiment, the spring 40 has been described as a single spring comprising a return spring portion 43 and an oppositely-wound opener spring portion 45 connected in series. The spring 40 has also been described as comprising a U-shaped connecting portion between the two spring portions 43, 45, the U-shaped connecting portion serving as the default position defining portion 47 or spring-side engaging member. However, in another embodiment, the return spring portion 43 and the opener spring portion 45 may be prepared as separate springs, and the default position defining portion 47 may be formed on a connecting member that connects the return spring and the opener spring. Such separate spring construction is disclosed, for example, in Japanese Patent Application Publication 2018-100598, which is hereby incorporated by reference.

In the above embodiment, the throttle gear 30 and the spring 40 have been described as set on the support fixture 50, when the processing is performed to cut the contact surface 37m of the gear-side fully closed position stopper 37 of the throttle gear 30. However, in another embodiment, the contact surface 37m may be cut after the throttle gear 30 and the spring 40 are directly set in the throttle body 10.

In the above embodiment, the body-side stopper 115 has been described as a combined component, where the single contact surface 115f of the body-side stopper 115 serves as both the body-side fully closed position stopper where the gear-side fully closed position stopper 37 is configured to come in contact and as the body-side engaging member where the default position defining portion 47 is configured to engage. However, in another embodiment, the body-side fully closed position stopper and the body-side engaging member may be separately provided, for instance at more distant locations on the throttle body 10.

The present technology is not limited to the above embodiment, and various modifications, substitutions, and alterations can be made without departing from the spirit of the present technology.

What is claimed is:

1. A method of producing a throttle device, the throttle device comprising:
    a throttle body with an intake passage configured to lead combustion air to an engine;
    a throttle valve equipped with a throttle shaft, the throttle valve being rotatable between a fully closed position and a fully open position within the intake passage;
    a throttle gear configured to transmit a rotational force from an electric actuator to the throttle shaft;
    a body-side fully closed position stopper on the throttle body and a gear-side fully closed position stopper on the throttle gear, wherein the body-side fully closed position stopper and the gear-side fully closed position stopper each comprises a contact surface, wherein the contact surface of the body-side fully closed position stopper is configured to block the gear-side fully closed position stopper to prevent the throttle valve from rotating in a closing direction beyond the fully closed position; and
    a biasing member urging the throttle gear to rotate the throttle valve from the fully closed position and from the fully open position toward an intermediate default position, the default position being a predetermined angle from the fully closed position, wherein the biasing member comprises:
    a return spring urging the throttle valve in the closing direction when the throttle valve is opened more than the default position;
    an opener spring urging the throttle valve in an opening direction when the throttle valve is closed more than the default position; and
    a connecting member connecting the return spring and the opener spring, wherein the connecting member comprises a default position defining member comprising a contact surface configured to:
        contact a contact surface of a gear-side engaging portion of the throttle gear when the throttle valve is opened more than the default position, and
        contact a contact surface of a body-side engaging portion of the throttle body when the throttle valve is closed more than the default position,
    the method comprising the step of:
        processing the contact surface of at least one of:
            the gear-side fully closed position stopper on the throttle gear,
            the body-side fully closed position stopper on the throttle body,
            the default position defining member,
            the body-side engaging portion of the throttle body, or
            the gear-side engaging portion of the throttle gear,
        by removing material from or deforming the contact surface being processed to alter a circumferential position of the contact surface being processed so that an angle between the fully closed position and the default position reaches the predetermined angle.

2. The method of claim 1, wherein the step of processing is either processing the contact surface of the gear-side fully closed position stopper or processing the contact surface of the body-side fully closed position stopper.

3. The method of claim 2, wherein the step of processing is performed while the contact surface of the default position defining member of the biasing member is in contact with the contact surface of the body-side engaging portion of the throttle body.

4. The method of claim 1, wherein the step of processing comprises the step of cutting either the contact surface of the gear-side fully closed position stopper or cutting the contact surface of the body-side fully closed position stopper.

5. The method of claim 1, wherein the contact surface of the gear-side fully closed position stopper or the contact surface of the body-side fully closed position stopper is formed as a top face of a truncated pyramid.

6. The method of claim 1, further comprising the step of:
    setting the throttle gear and the biasing member on a support fixture configured to support the throttle gear and the biasing member with the biasing member contacting the support fixture, wherein the support fixture comprises:
        a shaft member configured to support the throttle gear in the same manner as the throttle shaft, and
        a positioning member located at a position corresponding to the body-side fully closed position stopper of the throttle body,
    wherein the step of processing is processing the contact surface of the gear-side fully closed position stopper while the contact surface of the default position defining member of the biasing member contacts a lower contact surface of the positioning member of the support fixture such that a distance between the support fixture and gear-side fully closed position stopper increases.

7. The method of claim 6, further comprising the steps of:
    removing the throttle gear and the biasing member from the support fixture;
    setting the throttle gear, the biasing member, and the throttle shaft in the throttle body such that the throttle gear and the throttle shaft are in a state where they are rotatable relative to each other;
    holding the contact surface of the gear-side fully closed position stopper in contact with the contact surface of the body-side fully closed position stopper;
    holding the throttle valve in the fully closed position while the contact surface of the gear-side fully closed position stopper is in contact with the contact surface of the body-side fully closed position stopper; and
    fixing the throttle shaft and the throttle gear so that they are non-rotatable relative to each other.

8. The method of claim 1, wherein the biasing member is a single spring comprising the return spring and the opener spring connected in series.

9. The method of claim 1, wherein the angle between the fully closed position and the default position is smaller than the predetermined angle before performing the processing step.

10. The method of claim 1, wherein the step of processing comprises increasing the angle between the fully closed position and the default position until the predetermined angle is achieved.

* * * * *